United States Patent
Martinson

(10) Patent No.: US 9,765,711 B2
(45) Date of Patent: Sep. 19, 2017

(54) SYSTEM AND METHOD FOR DETERMINING INFORMATION RELATED TO A ROTATION OF A SHAFT

(71) Applicant: Deere & Company, Moline, IL (US)

(72) Inventor: Peter D. Martinson, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 63 days.

(21) Appl. No.: 14/722,206

(22) Filed: May 27, 2015

(65) Prior Publication Data
US 2016/0348597 A1    Dec. 1, 2016

(51) Int. Cl.
| | | |
|---|---|---|
| F02D 37/02 | (2006.01) | |
| F02D 41/30 | (2006.01) | |
| G01D 5/12 | (2006.01) | |
| G01D 5/26 | (2006.01) | |
| G01D 5/245 | (2006.01) | |
| G01D 5/249 | (2006.01) | |

(52) U.S. Cl.
CPC ......... F02D 37/02 (2013.01); F02D 41/3005 (2013.01); G01D 5/12 (2013.01); G01D 5/2455 (2013.01); G01D 5/2492 (2013.01); G01D 5/26 (2013.01)

(58) Field of Classification Search
CPC ....... F02D 37/02; F02D 41/3005; G01D 5/12; G01D 5/26
See application file for complete search history.

(56) References Cited

U.S. PATENT DOCUMENTS 5,184,590 A * 2/1993 Hashimoto ........... F02P 5/1502
                                                    123/406.58
5,250,925 A * 10/1993 Shinkle .................. H01L 43/02
                                                    174/551

(Continued)

FOREIGN PATENT DOCUMENTS

| DE | 3623449 A1 | 1/1988 |
| EP | 0947805 A2 | 10/1999 |

OTHER PUBLICATIONS

Holley-HP EFI-Northstar Ignition Harness [online forum] Feb. 2015. http://forums.holley.com/showthread.php?13225-HP-EFI-Northstar-Ignition-Harness [Retrieved on Mar. 18, 2015].

(Continued)

*Primary Examiner* — Hieu T Vo
*Assistant Examiner* — Sherman Manley

(57) ABSTRACT

A system and method for determining information related to a rotation of a shaft. The method includes receiving a signal associated with a plurality of targets and gaps passing by a sensor. The targets and gaps are positioned around a circumference of a wheel that is fixed for rotation with the shaft. The method includes forming a sensed target-and-gap sequence based on the signal, wherein the sensed target-and-gap sequence represents a subset of the targets and gaps. The method further includes comparing the sensed target-and-gap sequence to a set of known target-and-gap sequences stored in memory. Each known target-and-gap sequence is associated with a respective known circumferential portion of the wheel. The method also includes determining which respective, known target-and-gap sequence is identical to the sensed target-and-gap sequence.

19 Claims, 3 Drawing Sheets

(56) References Cited

U.S. PATENT DOCUMENTS

| | | | | |
|---|---|---|---|---|
| 5,361,629 | A * | 11/1994 | McCombie | G01M 15/11 701/110 |
| 5,699,769 | A * | 12/1997 | Uchinami | F02P 7/077 123/406.58 |
| 5,794,171 | A * | 8/1998 | Bryant | G01M 15/11 701/102 |
| 6,064,198 | A * | 5/2000 | Wolf | G01P 3/488 324/207.12 |
| 6,604,411 | B1 * | 8/2003 | Mingo | G01M 15/06 73/114.27 |
| 6,752,009 | B2 | 6/2004 | Minich et al. | |
| 6,879,151 | B2 * | 4/2005 | Iwase | G01D 11/245 324/207.25 |
| 7,076,361 | B2 * | 7/2006 | Wang | G01M 15/06 701/115 |
| 7,362,018 | B1 * | 4/2008 | Kulogo | H02K 21/222 310/153 |
| 9,108,641 | B2 * | 8/2015 | Yone | B60W 40/12 |
| 2003/0037607 | A1 * | 2/2003 | Minich | G01M 15/06 73/114.25 |
| 2003/0231013 | A1 | 12/2003 | Faymon et al. | |
| 2005/0278109 | A1 * | 12/2005 | Ando | F02D 41/009 701/112 |
| 2012/0078485 | A1 | 3/2012 | Verdejo et al. | |

OTHER PUBLICATIONS

Skaff, Luke; GM Cadillac Northstar Dis to GM HEI SBC ECM Project [online] Fall 2005. http://lukeskaff.com/?page_id=380 [Retrieved on Mar. 18, 2015].
European Search Report in foreign counterpart application No. 16169143.1 dated Dec. 8, 2016 (8 pages).

\* cited by examiner

SYSTEM AND METHOD FOR DETERMINING INFORMATION RELATED TO A ROTATION OF A SHAFT

FIELD OF THE DISCLOSURE

The present disclosure relates to a system and method for determining information related to a rotation of a shaft.

BACKGROUND OF THE DISCLOSURE

Internal combustion engines include a crankshaft and a camshaft, and at least one of these shafts may include a wheel positioned for rotation therewith. A sensor may be positioned adjacent to the wheel for providing a signal to a controller. The controller may use the signal for determining an angular velocity and position of the wheel and its respective shaft. The controller may use this information to control, for example, the application of a spark and fuel into the engine's cylinders. The longer that it takes to get useful information related to the rotation of the wheel, the longer that it takes for the controller to use this information and then apply it. If this information is inaccurate due to noise in the signal or accelerations of the wheel, then that may cause operating delays or cause the controller to misidentify the wheel's position.

SUMMARY OF THE DISCLOSURE

Disclosed is a method for determining information related to a rotation of a shaft. In the method, a controller receives a signal from a sensor, the signal being associated with a plurality of targets and gaps passing by the sensor. The targets and gaps are positioned around a circumference of a wheel that is fixed for rotation with the shaft, and the gaps are positioned between the targets. The controller forms a sensed target-and-gap sequence based on the signal. It represents a subset of the targets and gaps. The controller also compares the sensed target-and-gap sequence to a set of known target-and-gap sequences stored in memory, wherein each known sequence is associated with a respective circumferential portion of the wheel. Further, the controller determines which respective, known target-and-gap sequence is identical to the sensed target-and-gap sequence.

BRIEF DESCRIPTION OF THE DRAWINGS

The detailed description of the drawings refers to the accompanying figures in which.

Like reference numerals in the various drawings indicate like elements.

DETAILED DESCRIPTION OF THE DRAWINGS

Figure 1:
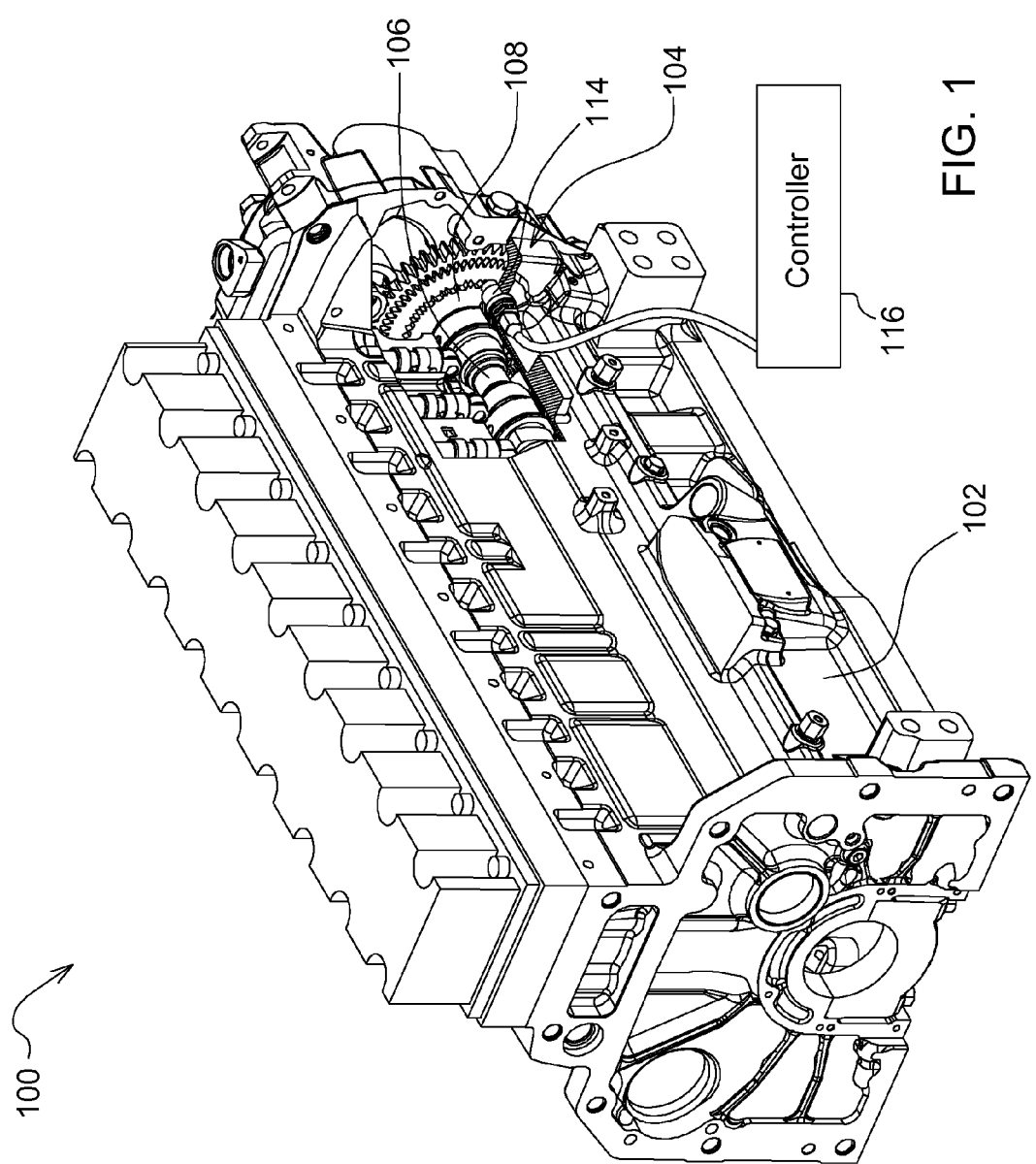
FIG. 1 is a perspective view of a power system having an example system for determining information related to a rotation of a shaft.

Referring to FIG. 1, there is shown a perspective view of a portion of a power system 100 for providing power to a variety of machines, including on-highway trucks, construction vehicles, marine vessels, stationary generators, automobiles, agricultural vehicles, and recreational vehicles. The engine 102 may be an internal combustion engine, such as a gasoline engine, a diesel engine, or any other exhaust gas producing engine. And further, the engine 102 may be of any size, have any number cylinders, and have any configuration.

Also, in FIG. 1, there is shown a system 104 for determining information related to a rotation of a shaft 106, such as an angular position or velocity thereof. The shaft 106 is shown as camshaft, but the system 104 could be used with a crankshaft or a transmission shaft or any other kind of rotating shaft.

The controller 116 may receive real time signal inputs from the sensor 114, and it may be in the form of an engine control unit or a transmission control unit or part of a controller area network, to name just a few examples. The controller 116 may use the angular position and velocity for many reasons, including for determining when to command fuel into the cylinders of the engine 102.

The wheel 108 includes a plurality of targets 110 and gaps 112 positioned therebetween, and they may be positioned about a circumference of the wheel 108. The other circumferential spaces may be, for example, the result of a rise and fall between two consecutive targets 110 positioned right beside one another. The wheel 108 may be made of steel or stainless steel or any other rigid material, and it may be mounted to the shaft 106, using a press fit or a weld, for example. The signal, provided by the sensor 114, may vary in amplitude as the targets 110 and gaps 112 pass thereby. Various sensors could be used as the sensor 114, including variable reluctance sensors, Hall effect sensors, optical sensors, and proximity sensors. An axis defined by the sensor 114 is shown being in parallel with an axis defined by the wheel 108, though in other arrangements, the axes could be perpendicular or of any other orientation.

Figure 2:
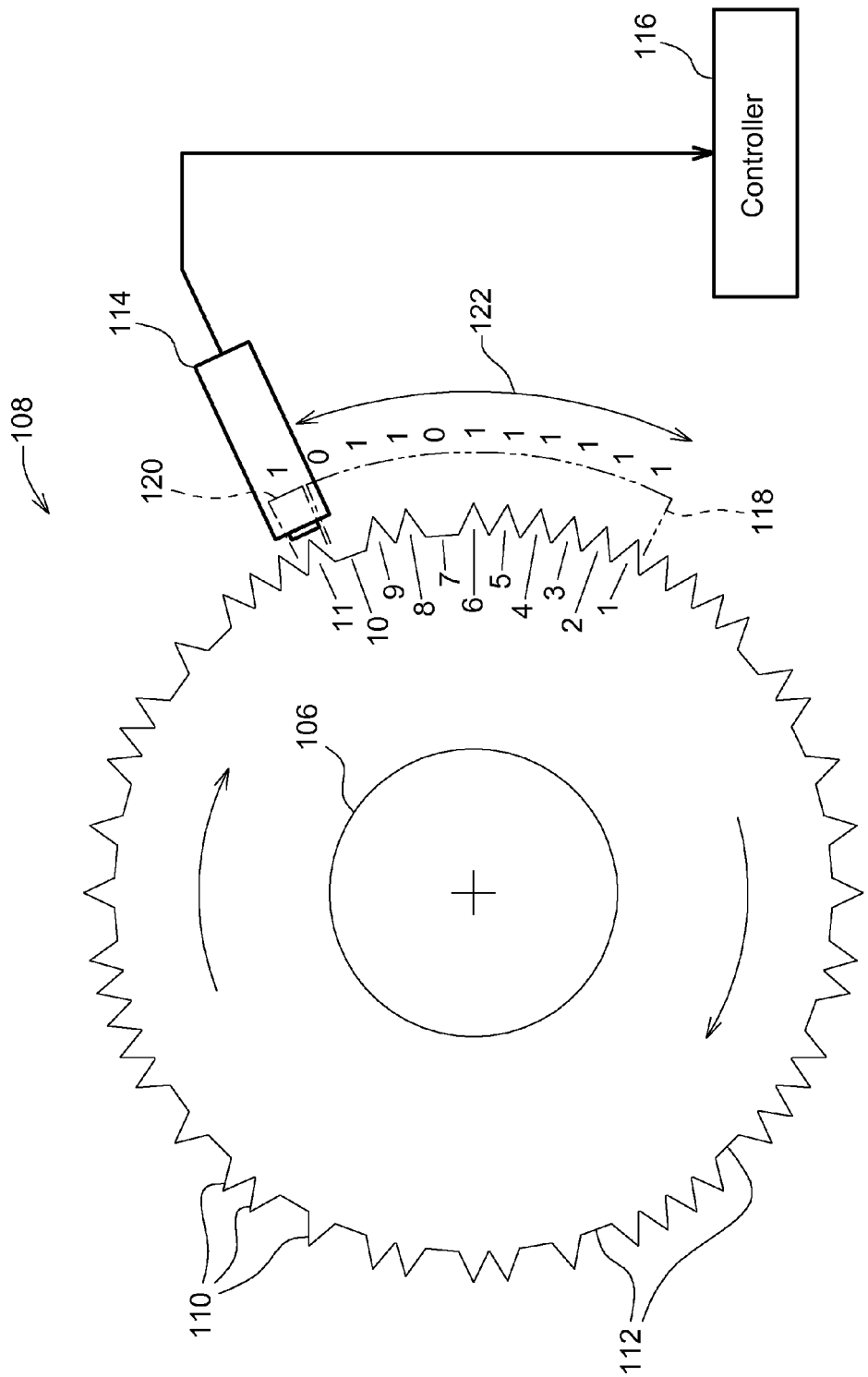
FIG. 2 is a schematic illustration of the example system for determining the information related to the rotation of the shaft.
Figure 3:
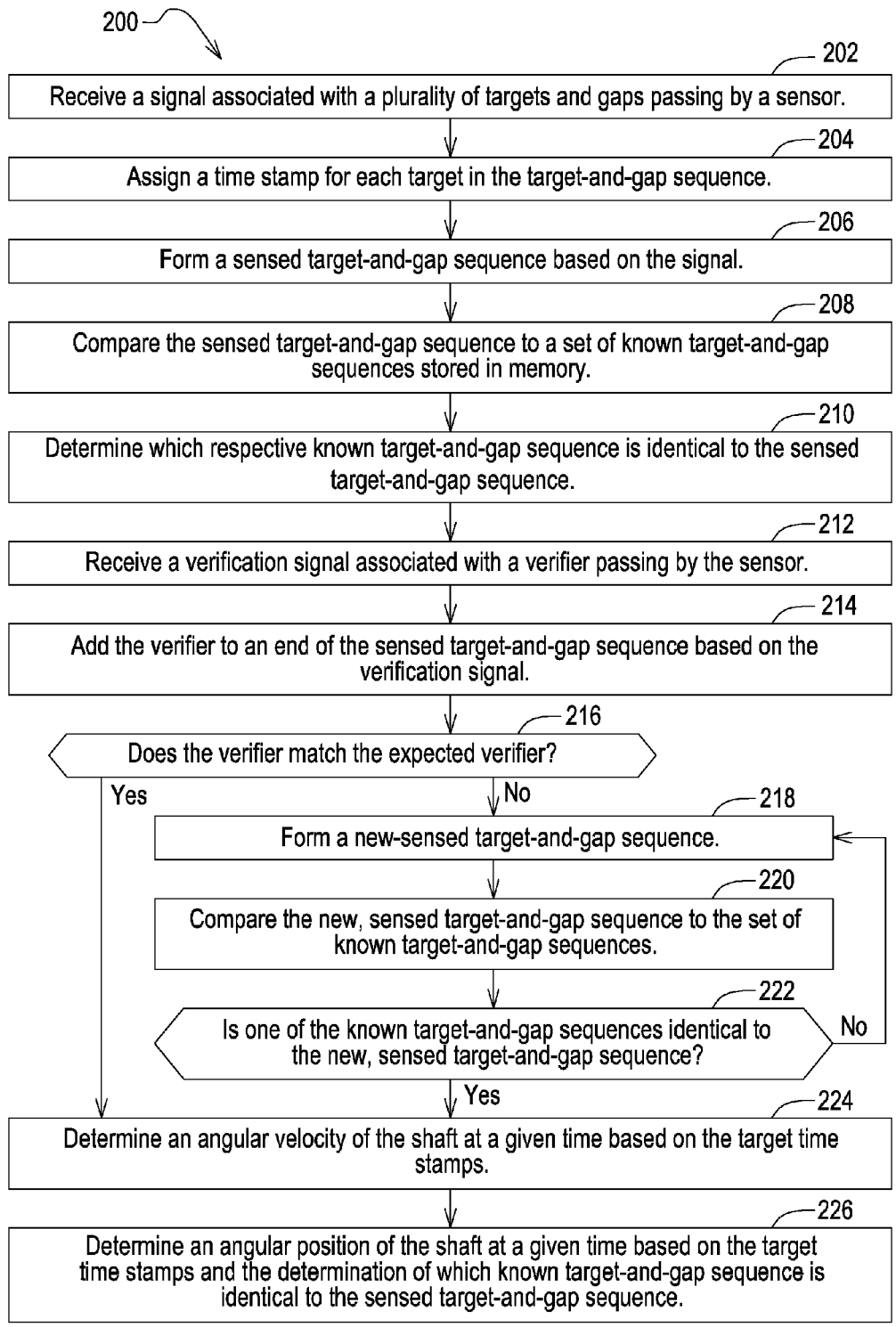
FIG. 3 is a flow chart of an example method for determining the information related to the rotation of the shaft.

Referring to FIG. 2, there is shown a schematic illustration of the system 104, and referring to FIG. 3, there is shown a method 200 for determining information related to the rotation of the shaft 106. At step 202, the controller 116 receives a signal associated with the targets 110 and gaps 112 passing by the sensor 114.

As shown in the illustrated wheel 108, the targets 110 may be in immediate and consecutive sequence with both sides of all of the gaps 112 (i.e., the wheel 108 may not have two gaps 112 in consecutive sequence with one another). By arranging the gaps 112 in this way, the wheel 108 may provide a more consistent, stable signal to the controller 116. Alternatively, with double and triple gaps, accelerations of the wheel 108 may be more difficult to detect, and there may be misidentifications (e.g., a double gap may result in a signal that is relatively similar to a triple gap). Additionally, by not having gaps 112 in consecutive sequence, the target-and-gap sequences may be angularly shorter, all other things equal.

In some embodiments of the wheel 108, all of the targets 110 may be identical to one another, meaning that they may all have identical widths and/or heights. Having identical targets 110 may result in the signal that the controller 116 receives being easier to delineate into individual targets 110.

At step 204, the controller 116 may assign a target time stamp to each target 110 in the target-and-gap sequence. The controller 116 may estimate when the gaps 112 pass by the sensor 114 based on the target time stamps. For example, a relatively long amount of time between consecutive target time stamps may be the result of a gap 112 between the previously sensed targets 110.

At step 206, the controller 116 forms a sensed target-and-gap sequence based on the signal, an example of which is illustrated by the reference numeral 118. The example sequence 118 is just one of the many different possible sensed target-and-gap sequences on just one example of a wheel. For example, other sensed target-and-gap sequences could be offset from the example sequence 118 and/or of a different length and the like. The example sequence 118 represents a subset of the targets 110 and gaps 112, shown as reference numerals 1 through 10 in FIG. 2.

The controller 116 may use a binary number system to represent the sensed target-and-gap sequence. In the illustrated embodiment and starting position, the example sequence 118 forms the binary array of [1111110110] if the shaft 106 begins rotating clockwise at 1 and rotates to 2, 3, 4, and so on. In this example, the controller 116 may be able to determine the angular position and velocity of the wheel 108 upon seeing a sum of ten targets 110 and/or gaps 112. This means that the controller 116 may determine this information after the wheel 108 rotates by (10/72)*360°. The length of the binary array (and the underlying sensed target-and-gap sequence) may vary, depending on the design of the wheel 108 and what is saved in memory on the controller 116. The controller 116 may also use a ternary system or a quaternion system and so on, depending on the sizes and widths of the targets 110 and gaps 112, for example.

At step 208, the controller 116 compares the sensed sequence to a set of known target-and-gap sequences stored in memory, each known sequence being associated with a respective, known circumferential portion of the wheel 108. The known sequences may be stored in memory in the controller 116, based on the arrangement of the targets 110 and gaps 112 positioned about the wheel 108. Referring back to the example sequence 118, [1111110110], the controller 116 may have this same array stored into memory as a known sequence, and it may associate that sequence with a known circumferential portion of the wheel 108, an example of which is shown by reference numeral 122. In some examples of system 104, such information may be stored for every incremental position about the wheel 108.

Exemplarily, a total number of known sequences may be equivalent to a total sum of the targets 110 and gaps 112. For example, the illustrated wheel 108 has a sum of 72 different targets 110 and gaps 112, and with such a wheel 108, the controller 116 may store a sum of 72 known sequences, each of which may be unique. The known sequences may be overlapping, such that two that are directly adjacent to one another are overlapping at all bits, but for one.

There are various methods for designing wheel 108 or one similar, but one example method for designing it and placing the targets 110 and gaps 112 is by writing a program that incrementally assigns them. For example, the method may incrementally work around the wheel 108, so as to always place a target 110 or a gap 112, such that the next target 110 or gap 112 results in a unique subset array. In other words, each array may be an array of numbers and each may be unique relative to all other arrays. Such a method may assume that all of the targets 110 and gaps 112 have equal widths, and that both sides all gaps 112 are surrounded by consecutive targets 110. These unique arrays may be saved as the known sequences, and they may all be unique and representative of a circumferential portion of the wheel 108.

In some embodiments of the wheel 108, each known sequence may be unique relative to all of the others, even when a length of each known sequence is a mathematically minimum length for doing so (for a sum of the targets 110 and gaps 112). For example, in the illustrated system 104, the length of the known sequence is ten units long, and each such sequence is unique. This is a mathematical minimum for the illustrated wheel 108, having a sum of seventy-two targets 110 and gaps 112.

There are various methods for determining the mathematical minimum. For example, calculating this minimum may be based on assuming that the targets 110 and gaps 112 have the same widths, that they represent numbers, and that each gap 112 is surrounded by consecutive targets 110. And further, calculating this minimum may based on trying a large sequence length and then incrementing down in sequence length until the length results in overlapping, but repeating, known sequences, regardless of how they are arranged in sequence. Then, calculating this minimum may finally be found by incrementing up in sequence length by one additional bit.

At step 210, the controller 116 determines which respective known sequence is identical to the sensed target-and-gap sequence. Again, referring to the example sequence 118, which in this embodiment and starting point is [1111110110], the controller 116 may determine which respective known sequence is identical thereto. The known sequence may be specific to a given circumferential portion of the wheel 108 and stored into memory, such that the controller 116 may then know the position of the wheel 108. In some embodiments of the method 200, if the sensed target-and-gap sequence matches a known sequence at step 210, then the method 200 may transition directly to steps 224 and 226. If there is not a match, then the method 200 may transition to a step similar to step 218, as discussed below.

In the illustrated embodiment of the method 200, at step 212, the controller 116 receives a verification signal associated with a verifier passing by the sensor 114. The verifier may indicate either a target 110 or a gap 112 of the plurality of targets 110 and gaps 112 passing by the sensor 114. As illustrated, the example verifier 120 is represented by the reference numeral 11, and it represents one of the targets 110.

At step 214, the controller 116 may add the verifier to an end of the sensed target-and-gap sequence based on the verification signal. For example, the example sequence 118 of [1111110110] may be offset and become [1111101101], so as to include the example verifier 120. Or in some other embodiments, the sensed target and gap may be added to, resulting in a longer sequence that also includes the verifier.

At step 216, the controller 116 may compare the verifier to an expected verifier. The expected verifier may be stored in memory and be expected to follow the sensed target-and-gap sequence. At step 218, the controller 116 may form a new, sensed target-and-gap sequence if the verifier does not match the expected verifier. In other words, a non-matching verifier may indicate that there is an error in the signal from the sensor 114, or an error in processing the signal in the controller 116. As such, the controller 116 may form the new, sensed target-and-gap sequence and try again.

At step 220, the controller 116 may compare the new, sensed target-and-gap sequence to the set of known sequences. And at step 222, the controller 116 may determine whether a known sequence is identical to the new, sensed target-and-gap sequence. If there is a match at step 222, then the controller 116 may proceed to step 224. But alternatively, if there is not a match, then the controller 116 may return to step 218 and form yet another new, sensed target-and-gap sequence. Such difficulties may be an indication of issues related to the sensor 114, the signal, or the controller 116—some or all of which may be based on the angular velocity (e.g., too slow) or accelerations (e.g., too fast and random) of the shaft 106.

At step 224, the controller 116 may determine an angular velocity of the shaft 106 based on the target time stamps. For example, the controller 116 may determine the angular velocity by dividing the angular distance between the targets 110 and gaps 112 by the measured time differences between the target time stamps. At step 226, the controller 116 may determine an angular position of the shaft 106 at a given time based on the target time stamps and the determination of which known sequence is identical to the sensed target-and-gap sequence. Exemplarily, the controller 116 may use the angular velocity and position information for determining when to output signals related to when to inject and ignite fuel in the respective cylinders, when to open and close intake valves, when to open and close output valves, and the like. Or more simply, the controller 116 may output signals related to when to inject and ignite fuel in the respective cylinders, when to open and close intake valves, when to open and close output valves, and the like based on the determination of which respective known target-and-gap sequence is identical to the sensed target-and-gap sequence.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A method for determining information related to a rotation of a shaft, the method comprising:
   receiving a signal associated with a plurality of targets and gaps passing by a sensor, the targets and gaps being positioned around a circumference of a wheel that is fixed for rotation with the shaft, the gaps being positioned between the targets;
   forming a sensed target-and-gap sequence based on the signal, the sensed target-and-gap sequence representing a subset of the targets and gaps, all of the gaps having identical angular widths;
   comparing the sensed target-and-gap sequence to a set of known target-and-gap sequences stored in memory, each known target-and-gap sequence being associated with a respective, known circumferential portion of the wheel;
   determining which respective known target-and-gap sequence is identical to the sensed target-and-gap sequence;
   determining an angular position of the shaft at a given time based on which known target-and-gap sequence is identical to the sensed target-and-gap sequence;
   injecting fuel based on the angular position of the shaft at the given time;
   receiving a verification signal associated with a verifier passing by the sensor, the verifier indicating either a target or a gap of the target and gaps;
   adding the verifier as an additional value to an end of the sensed target-and-gap sequence based on the verification signal; and
   comparing the verifier to an expected verifier, the expected verifier being stored in memory and expected to follow the sensed target-and-gap.

2. The method of claim 1, wherein the forming comprises forming the sensed target-and-gap sequence out of numbers.

3. The method of claim 1, comprising:
   forming a new, sensed target-and-gap sequence if the verifier does not match the expected verifier;
   comparing the new, sensed target-and-gap sequence to the set of known target-and-gap sequences; and
   determining which known target-and-gap sequence is identical to the new, sensed target-and-gap sequence.

4. The method of claim 3, comprising confirming an angular position of the shaft based on which known target-and-gap sequence is identical to the new, sensed target-and-gap sequence.

5. The method of claim 1, comprising assigning a target time stamp to each target in the target-and-gap sequence, each target time stamp representing when each respective target is sensed.

6. The method of claim 5, comprising determining an angular velocity of the shaft, at a given time, based on the target time stamps.

7. The method of claim 5, comprising determining the angular position of the shaft, at a given time, based on:
   the target time stamps; and
   the determination of which known target-and-gap sequence is identical to the sensed target-and-gap sequence.

8. A system for determining information related to a rotation of a shaft, the system comprising:
   a wheel fixed for rotation with the shaft, the wheel comprising a plurality of targets and a plurality of gaps positioned sporadically therebetween, the targets and gaps being positioned about a circumference of the wheel, all of the targets having identical angular widths;
   a sensor positioned adjacent to the wheel; and
   a controller coupled to the sensor, the controller configured to:
      receive a signal from the sensor, the signal being associated with the plurality of targets and gaps passing by the sensor;
      form a sensed target-and-gap sequence as each target-and-gap is sensed, the sensed target-and-gap sequence being a subset of the targets and the gaps;
      compare the sensed target-and-gap sequence to a set of known target-and-gap sequences stored in memory, each known target-and-gap sequence being associated with a known circumferential portion of the wheel;
      determine which respective known target-and-gap sequence is identical to the sensed target-and-gap sequence;
      determine an angular position of the shaft at a given time based on which known target-and-gap sequence is identical to the sensed target-and-gap sequence; and
      inject fuel based on the angular position of the shaft at the given time.

9. The system of claim 8, wherein the targets of the target-and-gap sequence are in immediate and consecutive sequence with both sides of all of the gaps of the target-and-gap sequence, and all of the gaps have identical angular widths.

10. The system of claim 8, wherein all of the targets are identical to one another.

11. The system of claim 8, wherein all of the gaps have identical angular widths.

12. The system of claim 8, wherein a total number of known target-and-gap sequences is equivalent to a total sum of the targets and gaps.

13. The system of claim 8, wherein each known target-and-gap sequence is a unique sequence, and a length of each known target-and-gap sequence is a mathematically minimum length for a sum of the targets and gaps.

14. The system of claim 8, wherein the controller is configured to form the sensed target-and-gap sequence out of numbers.

15. The system of claim 8, wherein the controller is configured to:
receive a verification signal from the sensor, the verification signal is associated with a verifier that is immediately following the sensed target-and-gap sequence and that indicates either a verifying target or a verifying gap;
add the verifier as an additional value to an end of the sensed target-and-gap sequence based on the verification signal; and
compare the verifier to an expected verifier, the expected verifier is based on a known verifier that is stored in memory and that is expected to follow the sensed target-and-gap sequence.

16. The system of claim 15, wherein the controller is configured to:
form a new, sensed target-and-gap sequence if the verifier does not match the expected verifier;
compare the new, sensed target-and-gap sequence to the set of known target-and-gap sequences stored in memory;
determine which respective known target-and-gap sequence is identical to the new, sensed target-and-gap sequence; and
confirm information related to the rotation of the shaft if the verifier matches the expected verifier.

17. The system of claim 16, wherein the controller is configured to assign a target time stamp to each target in the target-and-gap sequence.

18. The system of claim 17, wherein the controller is configured to determine an angular velocity of the shaft, at a given time, based on the target time stamps.

19. The system of claim 17, wherein the controller is configured to determine the angular position of the shaft, at a given time, based on:
the target time stamps; and
the determination of which known target-and-gap sequence is identical to the sensed target-and-gap sequence.

* * * * *